Patented June 24, 1930

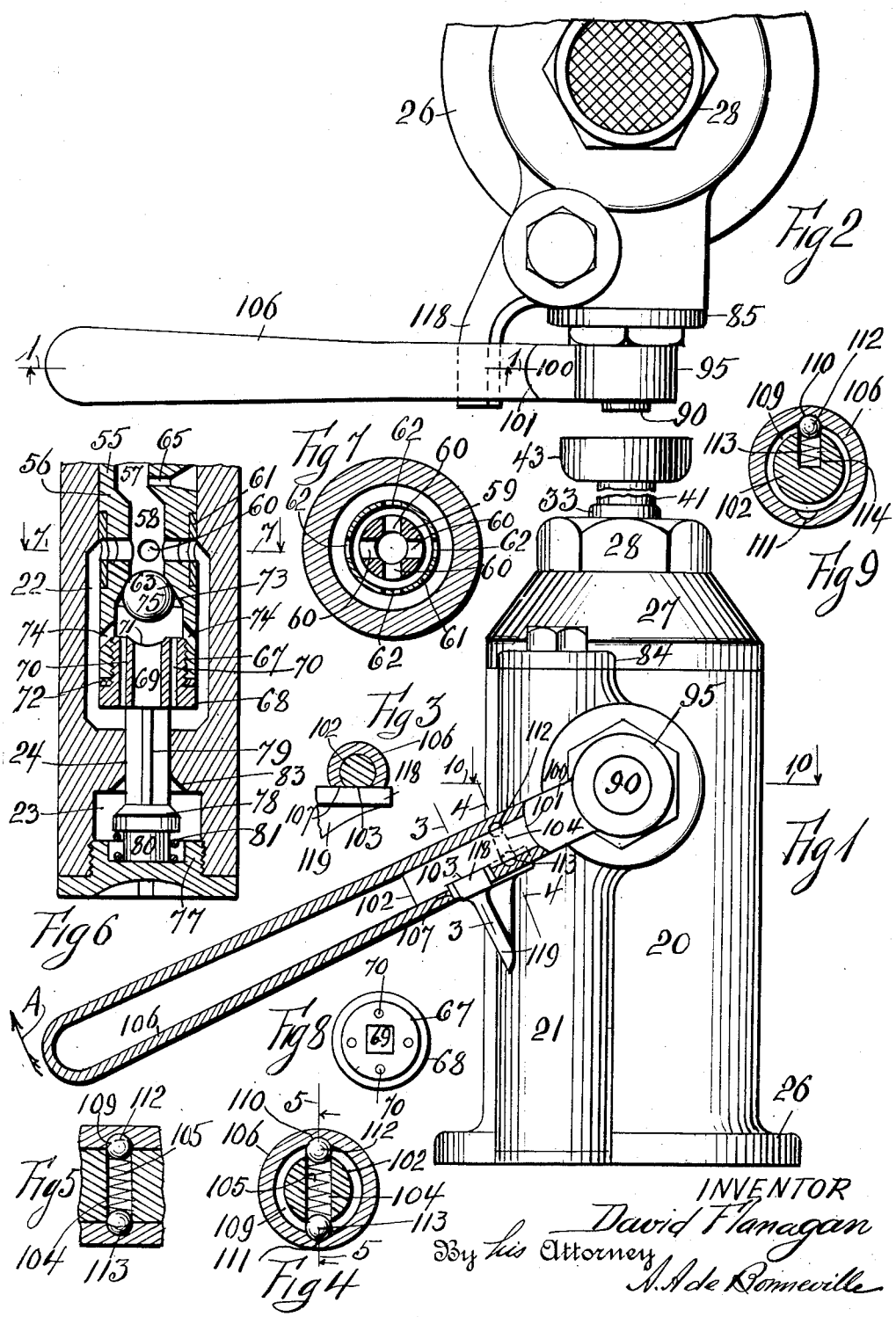

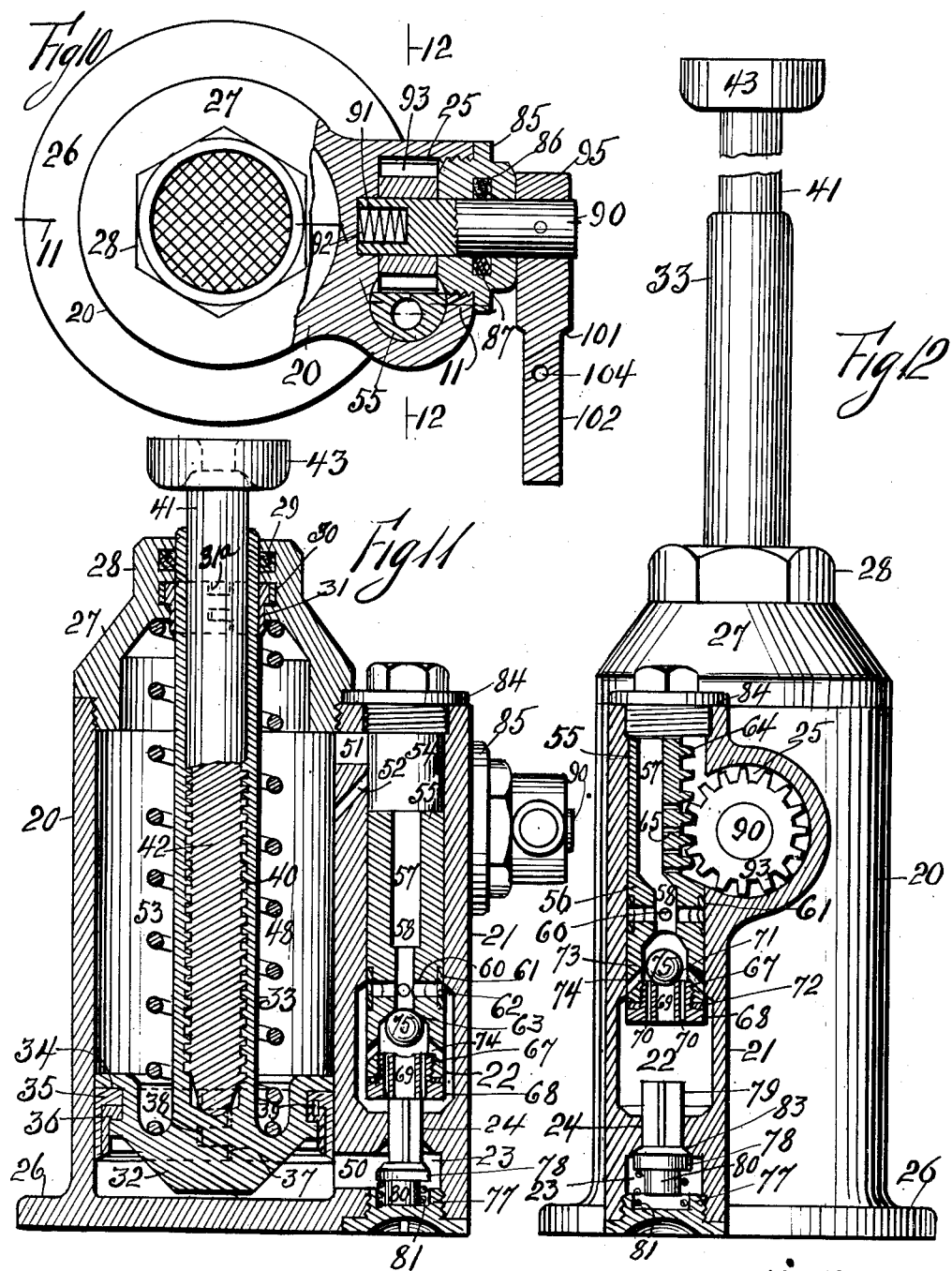

1,767,124

UNITED STATES PATENT OFFICE

DAVID FLANAGAN, OF BAYONNE, NEW JERSEY

HYDRAULIC JACK

Application filed May 31, 1928. Serial No. 281,709.

This invention relates to an hydraulic jack.

The object of the invention is the production of an hydraulic jack operating with a fluid, and under the complete control of the operator. The second object of the invention is the production of an hydraulic jack which will safely raise a load with the swinging of an operating handle, and which will securely hold the load unless intentionally lowered. The third object of the invention is the production of an hydraulic jack which is compact, simple in construction and easily operated.

In the accompanying drawings Fig. 1 represents a side elevation of an exemplification of the hydraulic jack and partial section as on the line 1, 1 of Fig. 2; Fig. 2 shows a top view partly broken away of Fig. 1; Fig. 3 indicates a section of Fig. 1 on the line 3, 3; Fig. 4 is an enlarged section of Fig. 1 on the line 4, 4; Fig. 5 represents a section of Fig. 4 on the line 5, 5; Fig. 6 shows an enlarged fragmentary portion of Fig. 12 with the movable elements in a changed position; Fig. 7 indicates a section of Fig. 6 on the line 7, 7; Fig. 8 represents a top plan view of a detail; Fig. 9 shows a section similar to Fig. 4 with a modification; Fig. 10 is a partial top view and section of Fig. 1 on the line 10, 10; Fig. 11 represents a section of Fig. 10 on the broken line 11, 11 and Fig. 12 indicates a left hand side view and section of Fig. 10 on the line 12, 12.

The hydraulic jack in this instance comprises the operating cylinder 20, which has cast integral therewith the pump barrel 21. The latter has formed therewith adjacent to its lower end the working chamber 22 larger in diameter than the bore of said pump barrel. A valve chamber 23 is formed at the lower end of said barrel 21, and a guide opening and port 24 is interposed between the chambers 22 and 23. A gear chamber 25 is formed with the barrel 21. A flange 26 is provided for both said cylinder and barrel. A bonnet 27 is in threaded engagement with the upper open end of the cylinder 20, and has formed therewith the upper hexagonal portion 28. Soft packing 29 and a circular packing ring 30 and L shaped packing 31 are located in the hexagonal portion 28. The packing rings 30 and 31 are split and their ends are provided with interlocking connections 31ᵃ. A piston 32 is adapted to reciprocate in the cylinder 20 and has extending therefrom the hollow piston rod 33, which latter extends through the portion 28 and is packed by the packing 29 and the packing rings 30 and 31. The piston 32 is pyramidal in shape and has formed therewith the annular groove 34 for the metallic split packing rings 35 and 36. The said rings are each L shaped in cross-section with the outer one 35 located upon the inner ring 36. Both of said rings 35 and 36 are split and their ends have interlocking connections indicated at 37 and 38. A dowel pin 39 connects the two packing rings 35 and 36 to space the interlocking connection of one ring from the other. A portion of the tubular piston rod 33 has formed therewith an internal thread 40. A supporting rod 41 adapted to enter the piston rod 33 has formed therewith the exterior threaded portion 42, which latter engages the thread 40. The jack head 43 is supported at the top end of the rod 41. A helical spring 48 bears between the piston 32 and the bonnet 27. An operating port 50 connects the chambers 53 of the cylinder 20 and the chamber 23, and an operating port 51 connects the said chamber 53 and the chamber 54 of the pump barrel 21. A by-pass port 52 also connects the chambers 53 and 54.

In the pump barrel 21 is located the plunger of the hydraulic jack indicated at 55 and having the lower offset portion 56. The plunger has extending therethrough the longitudinal port 57 having the offset 58 at its lower end. The said plunger has formed therewith the portion 59 reduced in diameter, having the release ports 60. A split packing ring 61 having the release ports 62 covers the reduced portion 59, and its ports 62 coact with the corresponding ports 60. A top valve seat 63 is formed at the lower end of the offset 58. A rack 64 is formed with the upper portion of the plunger 55 and ports 65 connect the port 57 and the gear chamber 25. A plunger bushing 67 is indicated with the flange 68 and is in threaded engagement with the lower end of the plunger 55.

A main port 69 preferably rectangular in cross-section and supplemental ports 70 are formed in the plunger bushing 67. A bottom valve seat 71 is formed at the upper end of the bushing 67. A lock washer 72 is interposed between the lower end of the plunger and the flange 68 of the bushing 67. A valve chamber 73 is formed in the plunger having the release ports 74. A ball valve 75 is located in the valve chamber 73. A cap 77 is in threaded engagement with the lower end of the said pump barrel. A discharge valve 78 has formed therewith the guide wings 79 and the lower extending plug 80. A helical spring 81 bears between the valve 78 and the cap 77. A valve seat 83 is formed between the working chamber 22 and the valve chamber 23. A filling plug 84 is in threaded engagement with the upper end of the pump barrel. A screw cap 85 is in threaded engagement with the wall of the chamber 25, and is provided with the cavity 86 for the soft packing 87. An operating shaft 90 has one end journaled in the wall of the cylinder 20 and its other end is journaled in the screw cap 85. A cavity 91 is formed in one end of the shaft 90 and a spring 92 bears between the wall of the cylinder 20 and the bottom of the cavity 91. A spur gear 93 is fastened to the operating shaft 90.

A hub 95 has extending therefrom the cylindrical shank 100 with the spherical end 101, and the reduced cylindrical portion 102. The latter has formed therewith the flattened portion 103. An opening 104 is formed through the cylindrical portion 102 and a spring 105 is located in said opening. A sleeve handle 106, having the opening 107 in its wall encircles the cylindrical portion 102 and has formed therewith the annular groove 109 with the diametrically opposite seats 110 and 111. Balls 112 and 113 are seated in the seats 110 and 111 and are maintained in operative position by means of the spring 105. The balls 112 and 113 with their seats 110 and 111 constitute an automatic double lock. One of said balls may be omitted as indicated in Fig. 9, which shows the sleeve handle 106 with its groove 109, the two ball seats 110 and 111 and one ball 112 with its coacting spring 113 seated in the cavity 114 in the portion 102.

A bracket 118 with the rib 119 extends from the wall of the pump barrel 21 and is located to coact with the opening 107.

To operate the hydraulic jack, the plunger 55 is reciprocated until the piston 32 and thereby the jack head 43 is raised to its elevated position. In Figs. 1 and 11, the piston 32 and the plunger 55 are shown at the ends of their down stroke. To raise the piston 32, the operator first turns the sleeve handle 106 through an angle of 180 degrees from the position shown in Fig. 1, to locate the opening 107 of said handle out of the path of the bracket 118. When the said handle 106 is thus turned, the ball seat 111 will be locked with the ball 112, and the ball seat 110 will be locked with the ball 113. This provides an automatic double lock for the two positions of the sleeve handle 106. The operator then swings up the sleeve handle 106 in the direction of the arrow A (Fig. 1), whereby the spur gear 93 is turned a part of a revolution and the teeth of the rack 64 meshing with the teeth of said spur gear 93 the plunger 55 is raised to the end of its up stroke, as indicated in Fig. 12.

As the plunger 55 rises the ball valve 75 seats on the seat 71 of the plunger bushing 67, and the operating fluid, preferably lubricating oil in the chamber 54 of the pump barrel 21 descends through the port 57 and its offset 58 and enters the valve chamber 73. The operating fluid next flows through the ports 74 and enters the working chamber 22 of the pump barrel 21, and when the ports 74 are cut off by the bore of the pump barrel, as indicated in Fig. 12 the operating fluid in the valve chamber 73 escapes through the supplemental ports 70 into the working chamber 22. The operator next swings the sleeve handle 106 in a direction opposite to the arrow A (Fig. 1) and the plunger 55 descends while the ball valve 75 seats against the valve seat 63. As the plunger 55 descends the operating fluid is forced from the chamber 22 into the valve chamber 23, the pressure of the working fluid separating the discharge valve 78 from the valve seat 83. By this means the operating fluid is forced through the port 50 into the chamber of the cylinder 20 below the piston 32, which latter is thereby raised a small distance. At the same time some of the operating fluid in the chamber of the cylinder 20 above the piston is forced through the ports 51 and 52 into the chamber 54 at the upper end of the pump barrel 21. The reciprocations of the plunger 55 are repeated until the piston is at the predetermined upper end of its stroke, which occurs when the lower edge of the packing ring 35 uncovers the by pass port 52, at which instant the operating fluid below the piston 32 flows into the pump barrel 21 and said piston remains at rest. With the sleeve handle 106 positioned as described the plunger 55 cannot descend as low as indicated in Fig. 11. This lowest position can only be attained when the said sleeve handle 106 is positioned as indicated in Fig. 1 with its opening 107 in the path of the bracket 118, so that said sleeve handle can be swung to its lowest position. When the plunger 55 is in its lowest position as indicated in Figs. 6 and 11, the ports 60 and 62 are uncovered and the operating fluid is not forced through the port 50, but flows through said ports 60 and 62 back into the ports 58 and 57. At the same time the lower face of the flange 68 of the plunger bushing 67 bears on the wings 79 of the valve 78 and forces the latter off of its seat, and the fluid in the cylinder 20 below the piston 32 flows into working chamber 22. At this time the tension of the spring 48 lowers the piston 32 with the jack head 43. I designate the position of the plunger 55 when its ports 60 and 62 are uncovered as the point of release. To fill the hydraulic jack with operating oil the filling cap 84 is unscrewed from the pump barrel 21, and the oil is pumped into said barrel which will flow through the ports 57, 58, and valve chamber 73, then through the working chamber 22 and the valve chamber 23, then through the port 50 into the chamber of the cylinder 20 below the piston 32. The oil is pumped until the piston 32 rises, so that its packing ring 35 uncovers the bypass port 52. When the hydraulic jack is being filled with oil the operating sleeve handle 106 is located with its opening 107 spaced from the bracket 118.

Various modifications may be made in the invention and the present exemplification is to be taken as illustrative and not limitative thereof.

Having described my invention what I desire to secure by Letters Patent and claim is:

1. In an hydraulic jack the combination of an operating cylinder, a piston adapted to reciprocate in the cylinder, a supporting rod moving with the piston, a pump barrel adjacent to said cylinder, said cylinder and barrel connected by ports for an operating fluid, a plunger in said barrel having release ports, a rack formed with the plunger, a gear chamber formed with the pump barrel, a shaft journaled in the gear chamber, a spur gear fastened to the shaft meshing with said rack, a hub fastened to said shaft having a shank with a cylindrical portion, a sleeve handle rotatably supported on the cylindrical portion of said shank to oscillate the operating shaft, means to lock the sleeve handle in different positions on said shank, said sleeve handle having an opening, and a bracket extending from the pump barrel positioned to coact with the opening in the sleeve handle to control the downward position and inclination of said sleeve handle, the lower-most portion of said sleeve handle uncovering the release ports of the plunger to release the pressure of the operating fluid under the piston in the operating cylinder.

2. In an hydraulic jack the combination of an operating cylinder, a piston adapted to reciprocate in the cylinder, a plunger in the pump barrel, the chambers of the cylinder and pump barrel connected by operating ports for an operating fluid, said plunger having release ports for the hydraulic jack, a shank having a cylindrical portion and a cavity, connections between the shank and the plunger, a spring located in the cavity of the shank, a sleeve handle having a circumferential groove on its inner surface, a pair of seats formed with said groove, a ball located in one of said seats bearing against said spring, said ball with its seat constituting an automatic lock, said sleeve handle having an opening in its wall, and a bracket extending from the pump barrel positioned to coact with the opening in the sleeve handle to control the lowest position of said sleeve handle, the said lowest position of the sleeve handle positioning the plunger to uncover its release ports.

3. In an hydraulic jack the combination of an operating cylinder, a movable piston in the cylinder, means to carry a load connected to the piston, a pump barrel adjacent to the cylinder, said cylinder and barrel connected by ports for an operating fluid, a plunger in said barrel having release ports, a gear chamber formed with the pump barrel, a shaft journaled in said gear chamber, connections between said shaft and plunger, a hub fastened to the shaft having a shank with a cylindrical portion, said cylindrical portion having an opening, a spring located in said opening, a sleeve handle having a circumferential groove on its inner surface, a pair of seats formed with said groove, a ball located in each seat bearing against said spring, said balls with their appurtenances constituting an automatic double lock, said sleeve having an opening in its wall, and a bracket extending from the pump barrel positioned to coact with the opening in the sleeve handle to control the downward position and inclination of said sleeve handle, the lowest position of said sleeve handle attained with the opening therein located over said bracket, the said lowest position of the sleeve handle positioning the plunger to uncover its release ports to release the pressure of the operating fluid under the piston in the operating cylinder.

Signed at the borough of Manhattan, city of New York in the county of New York and State of New York this 5th day of May A. D. 1928.

DAVID FLANAGAN.